United States Patent

Piper

[15] 3,668,141
[45] June 6, 1972

[54] PROCESS FOR PRECIPITATING LUMINESCENT ALKALINE EARTH HALOAPATITES

[72] Inventor: Roger D. Piper, Des Peres, Mo.

[73] Assignee: Mallinckrodt Chemical Works, St. Louis, Mo.

[22] Filed: Apr. 28, 1969

[21] Appl. No.: 822,099

[52] U.S. Cl. .................................................... 252/301.4 P
[51] Int. Cl. ............................................................ C09k 1/36
[58] Field of Search ............................ 252/301.4 P, 301.6 P

[56] References Cited

UNITED STATES PATENTS

| | | | |
|---|---|---|---|
| 3,538,014 | 11/1970 | Wachtel | 252/301.4 P |
| 3,060,129 | 10/1962 | Hoekstra et al. | 252/301.4 P |
| 3,242,369 | 3/1966 | King et al. | 252/301.4 P |

FOREIGN PATENTS OR APPLICATIONS

| | | | |
|---|---|---|---|
| 741,324 | 11/1955 | Great Britain | 252/301.4 |
| 717,653 | 10/1954 | Great Britain | 252/301.4 P |
| 868,711 | 5/1961 | Great Britain | 252/301.4 P |
| 927,351 | 5/1963 | Great Britain | 252/301.4 P |
| 927,352 | 5/1963 | Great Britain | 252/301.4 P |

*Primary Examiner*—Robert D. Edmonds
*Attorney*—Koenig, Senniger, Powers and Leavitt

[57] ABSTRACT

In the precipitation of luminescent alkaline earth haloapatites, control of particle size distribution and crystal form is improved by concurrently adding a first solution containing the alkaline earth ions and a second solution containing a major portion of the phosphate ions to a stirred aqueous precipitation medium, which initially contains a minor portion of the required phosphate ions. Also, the solutions are added to the precipitation medium in such a manner that the alkaline earth ions are dispersed into the main body of the precipitation medium relatively more slowly than the phosphate ions. Under preferred conditions, the haloapatites are thereby precipitated in the form of novel compact botryoidal agglomerates whose particle size and low tricalcium phosphate content makes them useful and advantageous for preparing the phosphor coatings used in fluorescent lamps and other fluorescent devices.

16 Claims, 7 Drawing Figures

CONCENTRIC VORTEX

FIG. 3

ECCENTRIC VORTEX

PROCESS FOR PRECIPITATING LUMINESCENT ALKALINE EARTH HALOAPATITES

BACKGROUND OF THE INVENTION

The present invention relates to improved methods for precipitating alkaline earth haloapatites and to novel compositions prepared thereby.

Activated alkaline earth halophosphates whose crystalline lattice is analogous to that of the naturally occurring mineral apatite are widely used as phosphors in fluorescent lamps. These alkaline earth haloapatites conform to the following general empirical formula:

$$(Ca)_{10}(PO_4)_6(F,Cl)_2{:}A$$

where A represents one or more activator ions such as antimony, manganese, various rare earth elements and the like. Such compositions may also contain smaller amounts of strontium and cadmium along with the calcium. The halide constituent is usually fluoride along with a smaller proportion of chloride which serves primarily to modify the color of the luminescence. The primary activator is usually trivalent antimony with divalent manganese as a secondary activator.

Such phosphor compositions are commercially prepared by firing a mixture of suitably purified and finely powdered source compounds whereby through a combination of solid phase reaction and diffusion a calcium haloapatite host lattice is formed in which are incorporated the necessary activators and modifiers. This process is highly empirical and control of the composition and quality of the final product is for the most part dependent upon the nature and purity of the source compounds and the temperature and duration of the firing step.

In order to obviate the difficulties inherent in the aforementioned ceramic process it has been abandoned, to prepare these alkaline earth halophosphates by precipitation wherein the activators are incorporated in the precipitated halophosphate or during subsequent treatment. Processes of this kind are more fully described in the copending applications of D. J. Frese, R. S. Schreiber and H. C. Bertsch, Ser. No. 610,722, filed Jan. 23, 1967 (not abandoned, and coassigned, copending United States continuation patent application Ser. No. 9,103, filed Feb. 9, 1970, now U.S. Pat. No. 3,598,751), and Roger D. Piper, Ser. No. 646,493, filed June 16, 1967 (now abandoned; and coassigned, copending United States continuation patent application Ser. No. 7,408, filed Feb. 6, 1970, now U.S. Pat. No. 3,575,876).

However, certain difficulties have also been encountered with these precipitation processes, limiting the potential benefits that can be realized from their use. For example, precipitation at or near room temperature usually results in gel-like precipitates composed of very tiny crystallites which are difficult to wash and filter and which on drying form very hard cement-like lumps. Crushing these lumps produces a high proportion of fines which must be removed and discarded in order to obtain a particle size distribution in the 3 to 30 micron range considered optimum for use in fluorescent lamp tubes.

At higher temperatures the precipitates tend to be granular rather than gel-like, but even so a large proportion of the particles are usually small and outside the desired 3 to 30 micron range. Moreover, the granular products obtained at higher precipitation temperatures tend to form a secondary phase of tricalcium phosphate when they are subsequently fired and this tendency is enhanced when the reaction conditions are optimized to precipitate granular particles of the desired size. It is generally desirable to restrict the tricalcium phosphate content of such granular products to less than 3 percent by weight, preferably less than 1 percent by weight, since the presence of tricalcium phosphate tends to disrupt the normal relationship between manganese content and the color quality of the light emitted by a haloapatite phosphor containing manganese as an activator. By so restricting the tricalcium phosphate content, the necessity for removing tricalcium phosphate from the granular precipitated products, as by leaching, is also avoided.

As disclosed in the copending application of H. C. Bertsch, Ser. No. 736,279, filed June 12, 1968, now U.S. Pat. No. 3,575,877, the tendency to form this secondary tricalcium phosphate phase can be minimized by precipitating the haloapatite at a temperature close to but not exceeding 56° C. While the precipitates obtained under these conditions are granular and therefore easily filtered and washed, the particles are generally smaller than 3 microns in diameter. Removing the fine particles reduces the yield of usable product as well as adding to the manufacturing cost.

SUMMARY OF THE INVENTION

Among the several objects of the present invention may be mentioned the provision of improved methods for precipitation of luminescent compositions having an alkaline earth haloapatite host lattice; the provision of such methods which provide better control of particle size and crystal form of the said precipitated luminescent compositions; the provision of methods of this type which produce improved luminescent compositions and phosphors having a low tricalcium phosphate content; and the provision of said precipitated luminescent compositions and phosphors characterized by their novel and advantageous physical form and characteristics. Other objects and features of the invention will be in part apparent and in part pointed out hereinafter.

The present invention is directly broadly to a method for preparing a luminescent composition consisting essentially of a precipitated alkaline earth haloapatite host lattice having at least one activator incorporated therein which method comprises concurrently adding to a stirred aqueous precipitation medium a first reactant solution comprising the required alkaline earth ions and a second reactant solution comprising a major portion of the required phosphate ions, said aqueous precipitation medium initially containing a minor portion of the required phosphate ions. Preferably, the reactant solutions are added to the precipitation medium in such a manner that the alkaline earth ions are dispersed into the main body of the precipitation medium relatively more slowly than the phosphate ions. The invention is also directed to the novel granular luminescent and phosphor compositions obtained from the practice of the method and which comprise an alkaline earth haloapatite host lattice having at least one activator incorporated therein, the particles of which appear in electron microscope shadowgraphs as compact botryoidal agglomerates, the particle size of the said agglomerates being substantially within the range of from approximately 3 to approximately 30 microns, the compositions having a tricalcium phosphate content of less than approximately 3 percent.

BRIEF DESCRIPTION OF THE DRAWINGS

FIG. 5 is an electron shadow micrograph showing the non-botryoidal character of a calcium haloapatite prepared by a conventional firing method of the prior art;

FIG. 6 is an electron shadow micrograph of the luminescent composition prepared according to Example 6, prior to thermal refining thereof; and FIG. 7 is an electron shadow micrograph of the phosphor prepared according to Example 6, following thermal refining.

DESCRIPTION OF THE PREFERRED EMBODIMENTS

As employed herein the term "alkaline earth haloapatite" means an alkaline earth halophosphate, such as for example, calcium fluophosphate, having a crystal lattice essentially the same as that of the mineral apatite. By "concurrently added" is meant that the addition of the reactant solutions is commenced and completed within substantially the same time interval, the rates of addition of the individual solutions being adjusted for any difference in volume. By "luminescent composition" and "luminescent haloapatite" is meant the precipitated products resulting from the process disclosed herein, while the term "phosphor" is used to denote the finished materials used in coating fluorescent lamp tubes.

The initial excess of phosphate ions may be supplied by adding a small portion of the second reactant solution to the aqueous precipitation medium before the addition of the first reactant solution is begun, or a suitable source of phosphate ions may be dissolved separately in the medium.

To achieve the desired differential in the rates of dispersion for the alkaline earth and phosphate ions, the inlet for the first reactant solution may be located in a region where the precipitation medium is relatively quiescent. The inlet for the second reactant solution containing the phosphate ions is then located in a region where agitation of the medium is greater, and therefore the phosphate ions are more rapidly dispersed into the main body of the precipitation medium. For this purpose, the precipitation is carried out in a reaction vessel provided with means for imparting a swirling motion to the precipitation medium.

Under these conditions the velocity of the swirling medium is greater some distance from the vortex than it is at the vortex itself. Therefore by adding the alkaline earth ions in a region where the medium is relatively quiescent and adding the phosphate ions in a region where the velocity of the swirling medium is greater, the alkaline earth ions will be dispersed into the main body of the reaction medium more slowly than the phosphate ions and the required conditions for achieving the desired differential will be satisfied. It is also possible to adjust the speed of stirring or the location of the stirrer so that a portion of the precipitation medium is relatively quiescent. Also, the vortex need not be at the center of the reaction vessel, but it can be displaced to one side. In that case the cation solution may be allowed to trickle down the wall of the reaction vessel at a point where the medium is relatively quiet. However this may be accomplished, the important consideration is that the cations are dispersed into the main body of the precipitation medium more slowly than the phosphate ions.

In a swirling precipitation medium all portions of the medium do not move with the same velocity, in terms of volume of medium passing a given point within a given period of time. Thus, while the solution may be revolving rapidly at the vortex, the volume of medium is small. At some distance from the vortex the solution may be revolving less rapidly, yet the volume of medium passing a given point will be much greater than at the vortex.

The actual rates of dispersion for the alkaline earth and phosphate ions may be varied over wide limits provided that the differential is established as explained above.

Various means may be employed to impart the swirling motion to the precipitation medium. For small scale preparations this may be accomplished using a magnetic stirrer or a propeller-type stirrer. For large scale preparations a "Lightnin'" mixer may be used. The stirrer, whatever kind may be employed, should be positioned and its speed should be adjusted so as to impart the desired swirling motion.

The object is to avoid any violent turbulence or agitation of the preparation medium. Rather a smooth swirling motion is desired. The phosphate ions when added as described above are thereby distributed through a large portion of the precipitation medium whereas the alkaline earth ions are distributed through a more limited portion of the medium from which they actually disperse or diffuse into the main body of the medium.

Figure 1:
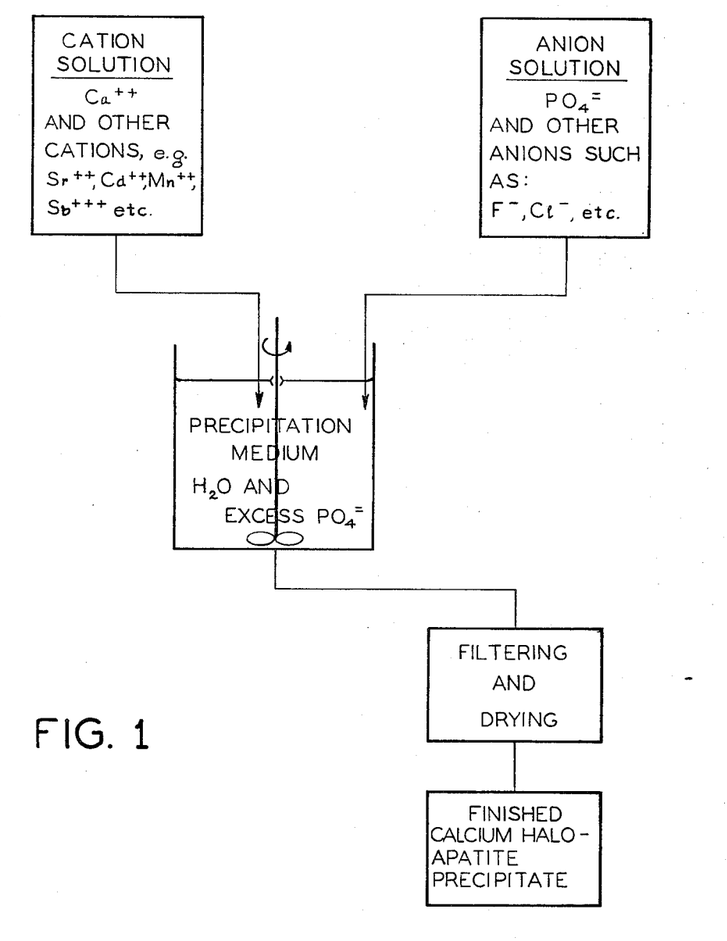
FIG. 1 is a flow diagram of the method of the present invention.
Figure 2:
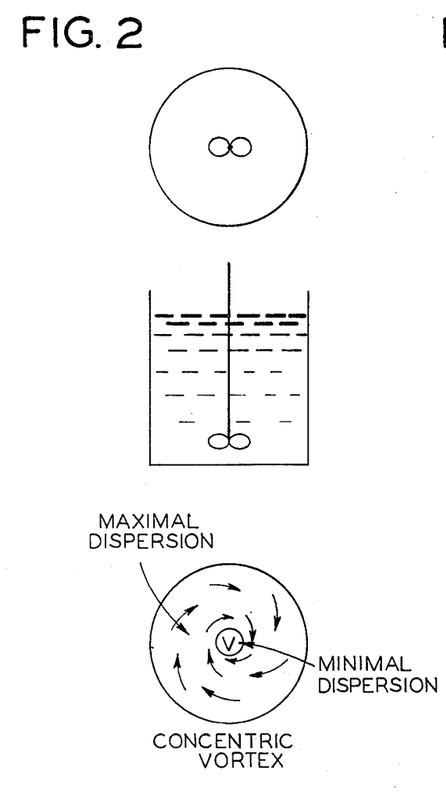
FIGS. 2 and 3 are diagrammatic representations of two alternate mechanical arrangements which may be used in carrying out the method of the invention.
Figure 3:
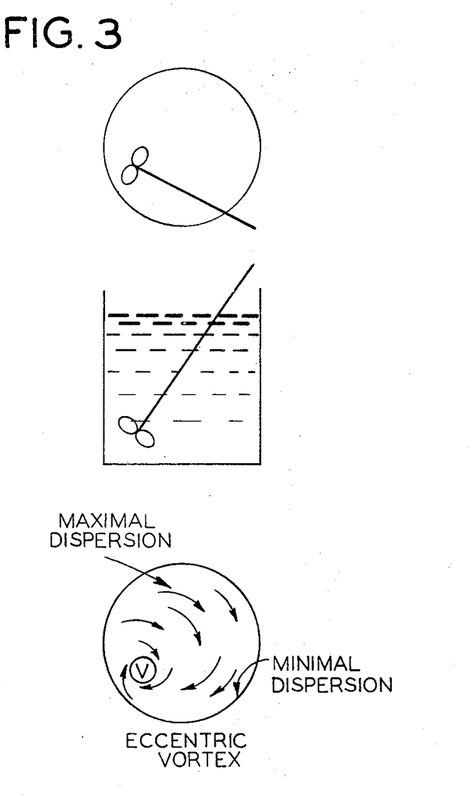

FIGS. 2 and 3 illustrate two different mechanical arrangements for achieving differential rates of dispersion for the alkaline earth and phosphate ions as previously explained. In the arrangement shown in FIG. 2, a concentric vortex is achieved by stirring the precipitation medium with a propeller-type stirrer disposed vertically in the center of the reaction vessel. With this arrangement, the area of minimal dispersion lies at the vortex of the reaction medium and the area of maximal dispersion is located approximately one-half the distance from the vortex to the periphery of the medium. Using this arrangement, the inlet for the alkaline earth reactant solution is located at the vortex of the reaction medium and the inlet for the anion reactant solution is located at some distance from the vortex, preferably where movement of the reaction medium is greatest. In the arrangement shown in FIG. 3, an eccentric vortex is achieved by stirring the precipitation medium with a propeller-type stirrer angularly disposed in the reaction vessel so as to create an off-center vortex. With this arrangement, the area of minimal dispersion lies at the periphery of the reaction medium and the area of maximal dispersion is located inwardly from the periphery as indicated. Using this arrangement, the inlet for the alkaline earth solution is located against the wall of the reaction vessel so that the solution trickles down the wall into the medium and the inlet for the anion solution is located in the region of maximum movement.

Figure 4:
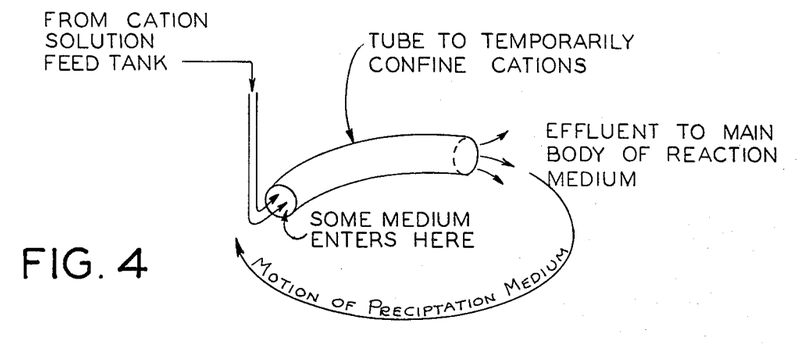
FIG. 4 is a diagrammatic representation of a mechanical device useful in carrying out the method of the invention.

FIG. 4 illustrates another arrangement which may be utilized for achieving the desired differential in the rates of dispersion. In this arrangement, a curved tubular baffle or shroud surrounds the inlet for the cation or alkaline earth solution so as to provide a short tunnel through which the alkaline earth ions must pass before entering the main body of the reaction medium. The inlet tube through which the alkaline earth solution passes may be positioned against the wall of the reaction vessel with its lower end extending into the baffle as shown. The effect of this arrangement is to isolate the alkaline earth ions temporarily in contact with a limited amount of the precipitation medium before they are dispersed into the main body of the medium.

The remainder of the required ions, e.g., halide ions, activator ions, etc. may be present in either the first or second reactant solution or in the precipitation medium. It is ordinarily most convenient, however, to include the metal activator ions in the first solution along with the alkaline earth ions. Likewise the fluoride ions are conveniently included in the second solution along with the phosphate ions.

The other ions present in the reactant solutions and the precipitation medium should be chosen so that the by-products of the precipitation are water-soluble and any residue in the precipitate will be volatilized during subsequent processing.

The invention is also directed to novel granular luminescent compositions of the aforementioned kind in the form of botryoidal granules. The botryoidal character of the granules is made apparent by electron microscopy. Carbon-platinum replicas of the particle surface can be viewed by transmission electron microscopy. When viewed at magnifications of about 10,000 X, the unrefined particles are seen as rounded agglomerates of tightly bound crystallites. The individual crystallites are approximately 50 A in diameter. The individual particle mass appears as a knobby clump of matter which has a crinkled surface.

The thermally refined particles consist of perfected crystallites greater than 1,000 A in size, having well-defined intercrystalline boundaries. The exposed crystalline surfaces are smooth and usually rounded with occasional hints of facet development. The over-all agglomerate mass may be described as botryoidal, that is resembling a cluster of grape-like sub-units which have been compressed to form a solid mass. The solid agglomerate has a knobby, rounded exterior and does not exhibit the flat planes and sharp edges characteristic of other haloapatites prepared by conventional methods such as have been used heretofore to prepare commercial phosphors.

Briefly, the above-mentioned replica or shadowgraph technique consists in depositing a coating of carbon and platinum on the surface of the particle, then dissolving away the haloapatite particle itself, leaving a semitransparent (to electrons) shell conforming to the external configuration of the particle. It is this shell or casing which is viewed through the electron microscope. Such shadowgraphs reveal structural details that would not otherwise be visible.

X-ray diffraction patterns of the unrefined material are characteristic of an apatite structure consisting of small (approximately 50 A) crystallites. The thermally refined products yield well-defined X-ray patterns indicative of crystallite growth. The patterns are characteristic of haloapatite phosphors. The presence of tricalcium phosphate is not evident in the unrefined precipitate. After the precipitate has been refined as described herein to increase the size of the crystallites and perfect their structure, the presence and amount of any tricalcium phosphate can be determined from the X-ray powder diffraction pattern. The unrefined precipitates of this invention are characterized by yielding phosphors having a tricalcium phosphate content of less than approximately 3 percent upon thermal refining as described hereinafter by heating at a temperature of 1,050°–1,200° C. for 5–10 minutes.

The low tricalcium phosphate content and desirable particle size of these granular compositions appears to be directly related to the manner in which the precipitate is formed; i.e., precipitation is initiated in a medium that is enriched with respect to alkaline earth ions, owing to their relatively slow diffusion into the main body of the reaction medium. Precipitation and agglomeration is then completed in the presence of a stoichiometric sufficiency of phosphate ions. In some manner not fully understood these conditions lead to the formation of a stable haloapatite lattice which includes the activator and color-modifier ions, and the formation of other crystalline lattices which lead to the formation of undesired secondary crystalline phases in the finished phosphor is inhibited or suppressed.

By appropriate control of other variables, as described hereinafter, granular compositions can be prepared whose particle size distribution is substantially within the 3 to 30 micron range desired for optimum luminescent performance in fluorescent lamps.

Although the granular luminescent compositions of the present invention are luminescent per se when excited by ultraviolet radiation (254 nm.), their brightness and color can be substantially improved by a thermal refining treatment which involves heating them at a temperature of approximately 1,050°–1,200° C. for a period of approximately 5–10 minutes. The changes which occur during this treatment are not fully understood, but they involve correction of defects in the crystal lattice, growth of the individual grains, secondary recrystallization, and perhaps other more subtle changes. As observed with the aid of an electron microscope, the surfaces of the individual grains after thermal refining appears substantially smoother, and the boundaries between the individual grains comprising the granules appear sharper and more distinct. Before thermal refining, the surface of the individual grains appear pebbled and the boundaries between the individual grains are somewhat fuzzy and indistinct. These differences may be observed by comparing the electron shadow micrographs of FIGS. 6 and 7.

The thermal refining treatment of the present invention differs significantly from the "firing" process used heretofore in making conventional phosphors. In conventional firing, a heterogeneous mixture is heated at an elevated temperature, usually for at least several hours, during which time a series of complicated chemical reactions occur involving diffusion and vapor-solid reactions, crystal formation and other transformations to produce a new and different chemical entity. In contrast, the thermal refining treatment of the present invention involves heating a homogeneous material at an elevated temperature for a relatively short period of time without any essential change in its basic chemical composition or crystal structure.

Additional activators and modifiers may also be introduced during the thermal refining treatment. For example, the chloride content may be increased by adding ammonium chloride to the material to be subjected to the thermal refining treatment. Moreover, the precipitated haloapatites of the invention may be subjected to other conventional finishing operations, such as particle size classification, in order to meet special needs and requirements.

The novel process of the invention may be carried out with the precipitation medium being maintained at temperatures in excess of 55°C., preferably within the range 55°–75° C. The pH of the precipitation medium may be varied over a wide range with satisfactory results and is preferably maintained within the range 4.0–8.5.

The following examples further illustrate the invention:

EXAMPLE 1

The following illustrates the use of the invention to prepare a simple, unactivated calcium haloapatite. The compositions and molar proportions of the reactant solutions and the initial composition of the precipitation medium are shown in Table I.

The precipitation medium was heated to 55° C. and stirred with a propeller-type stirrer arranged to impart a swirling motion to the medium. The inlet for the first reactant solution was located directly above the vortex of the swirling medium while the inlet for the second reaction medium was located approximately one-half to three-fourths the distance from the vortex to the periphery of the medium. This is the arrangement diagrammatically illustrated in FIG. 2.

The reactant solutions were added concurrently during a period of 65 minutes. The pH of the reaction medium was maintained within the range of 6.5 to 7.5 throughout the precipitation. Each of Examples 1–4 was carried out with the precipitation medium being maintained at a temperature of 55° C.

The resulting slurry was then filtered and the product was dried overnight at 120° C. The dried precipitate can be brushed through a 270 mesh screen to break up any lumps.

Using this method calcium haloapatite was obtained in the form of a dense granular powder. Electron microscope shadowgraphs showed the particles to be compact solid botryoidal agglomerates whose appearance is like that shown in FIG. 6. The average particle size of the agglomerates was about 7.0 microns as determined using a Fisher "Sub-Sieve Sizer" (manufactured by Fisher Scientific Co., Fairfield, N. J.). Microscopic examination showed further that the particles were substantially within the range of 3 to 30 microns. The agglomerates gave an X-ray diffraction pattern consistent with an apatite structure.

The precipitate was thermally refined by placing the powder in a quartz boat about 4 cm. deep by 4 cm. wide by 20 cm. long and pushing the boat through a tube furnace countercurrent to a slow flow of nitrogen. The boat was pushed at 1.2 cm. per minute and temperature zones in the furnace were arranged so that this push rate gave a heating rate of about 50° C. per minute and a residence time in the 1,125° to 1,175° C. zone of the furnace of about 10 minutes. The product was allowed to cool in nitrogen and then crushed to yield the finished product. The X-ray diffraction pattern showed the product to be essentially calcium haloapatite containing less than 1 percent tricalcium phosphate.

EXAMPLE 2

An activated haloapatite having a chemical composition similar to that of a commercial cool white phosphor is prepared as follows. The composition and molar proportions of the reactant solutions and the initial composition of the precipitation medium are shown in Table I. The reactant solutions were concurrently added to the precipitation medium as in Example 1 over a period of 87 minutes. The rates of addition were therefore approximately 40 mls. per minute for the solution containing the alkaline earth ions and 95 mls. per minute for the solution containing the phosphate ions.

A dried precipitate prepared in this manner was a dense granular powder consisting of compact botryoidal agglomerates whose average particle size was 8.8 microns. Microscopic examination showed further than the particles were substantially within the range of 3 to 30 microns. When subjected to thermal refining as described in Example 1, a phosphor containing less than 1 percent tricalcium phosphate was obtained.

EXAMPLE 3

Activated alkaline earth haloapatites can also be prepared by a variation of the method shown in Example 2. Instead of adding antimony to the first reactant solution, antimony trioxide can be suspended in the precipitation medium.

The reactant solutions were concurrently added to the precipitation medium (see Table I) over a period of 30 minutes. The rates of addition were therefore approximately 25 ml./min. for the solution containing the alkaline earth ions and 48 ml./min. for the solution containing the phosphate ions.

Using this method, a dense granular precipitate of the alkaline earth haloapatite containing 0.46 percent antimony was obtained. The average particle size of the botryoidal agglomerates was 6.0 microns. Microscopic examination showed further that the particles were substantially within the range of 3 to 30 microns.

When subjected to thermal refining as described in Example 1, the resulting phosphor contained 0.8 percent tricalcium phosphate.

EXAMPLE 4

In the following embodiment, the alkaline earth was precipitated without antimony in essentially the same manner as before. Then, at the end of the precipitation, 75 ml. of a solution containing 0.061 moles $SbCl_3$ and 0.028 moles $NH_4Cl$ was slowly added to the slurry. A typical precipitate prepared by this method contained 1 percent antimony and was in other respects comparable to those described in Examples 2 and 3.

TABLE I.—COMPOSITION OF REACTANT SOLUTIONS AND PRECIPITATION MEDIA

| | Example | | | |
|---|---|---|---|---|
| | 1 | 2 | 3 | 4 |
| First reactant solution: | | | | |
| $CaCl_2$ (moles) | 2.00 | 11.54 | 1.91 | 3.42 |
| HCl (moles) | | 0.967 | 0.272 | 0.348 |
| $SrCO_3$ (moles) | | 0.120 | 0.020 | 0.036 |
| $CdCO_3$ (moles) | | 0.167 | 0.028 | 0.036 |
| $SbCl_3$ (moles) | | 0.203 | | |
| $MnCl_2$ (moles) | | 0.209 | .035 | 0.063 |
| Water to make (ml.) | 750 | 3,510 | 750 | 1,200 |
| Second reactant solution: | | | | |
| $(NH_4)_2HPO_4$ (moles) | 1.20 | 7.20 | 1.20 | 2.10 |
| $NH_4F$ (moles) | 0.392 | 2.24 | 0.373 | 0.640 |
| $NH_3$ (moles) | 1.46 | 8.88 | 1.46 | 2.81 |
| Water to make (ml.) | 1,500 | 8,500 | 1,500 | 2,400 |
| Precipitation medium: | | | | |
| $NH_4Cl$ (moles) | 1.25 | 7.48 | | 9.35 |
| $Sb_2O_3$ (moles) | | | 0.017 | |
| $(NH_4)_2HPO_4$ (moles) | | | | 0.055 |
| Second reactant soln. (ml.) | 45 | 255 | 45 | 72 |
| Water to make (ml.) | 300 | 2,000 | 300 | 1,000 |

EXAMPLE 5

Various methods can be employed to achieve a differential in the rates at which the alkaline earth ions and the phosphate ions are dispersed into the main body of the reaction medium.

Instead of the arrangement described in Example 1, the medium may be stirred by a propeller agitator so that its vortex is off-center, leaving a portion of the medium relatively quiescent. The inlet for the first reaction solution is then located in this quiescent region and placed close to the wall of the reaction vessel so that the solution trickles down the wall into the medium. This is the arrangement generally illustrated in FIG. 3.

In using this arrangement, 267 gallon polyethylene cone-bottomed tank having a diameter of 39 ½ inches was employed as the precipitation tank or reaction vessel. At the start of precipitation, the depth of precipitation medium in the tank was 4 ¼ inches. At the completion of precipitation, the depth of reaction medium in the tank was 34 ½ inches. These depths were measured along the tank wall.

The impeller used for stirring was a stabilized "Lightnin'" type three-bladed (nominal 6 in. diameter) propeller agitator coated with polyvinylchloride having the following characteristics:

diameter — 6 ⅝ inches
blade length — 2 ¼ inches
blade width — 2 ⅛ inches
impeller pitch — 5 ¼ inches The impeller was positioned 2 inches off the tank bottom and rotated at a speed of 260 rpm.

The compositions and molar proportions of the reactant solutions and the initial composition of the precipitation medium were as follows:

First reactant solution:
| | |
|---|---|
| $CaCl_2$ (moles) | 487.76 |
| HCl (moles) | 85.68 |
| $Sb_2O_3$ (moles) | 2.820 |
| $SrCO_3$ (moles) | 5.033 |
| $CdCO_3$ (moles) | 5.145 |
| $MnCO_3$ (moles) | 9.682 |
| Water to make (gal.) | 46.2 |

Second reactant solution:
| | |
|---|---|
| $H_3PO_4$ (moles) | 303.93 |
| $NH_3$ (moles) | 1070.96 |
| $NH_4F$ (moles) | 89.29 |
| Water to make (gal.) | 95.0 |

Initial precipitation medium:
| | |
|---|---|
| $NH_4Cl$ (moles) | 381.60 |
| Second reactant solution (gal.) | 3.17 |
| Water to make (gal.) | 33.0 |

The first or cation reactant solution was directed down the tank wall and into the precipitation medium at the least-stirred point in the tank and the second or anion reactant solution was introduced into the tank in the region of maximal dispersion (see FIG. 3).

The total anion solution was 95 gallons and feed time was 4 hours giving an average anion solution addition rate of 0.396 gal./min. The total cation solution was 46.2 gallons and the feed time was 3 hours, 52 minutes, giving an average cation solution addition rate of 1.99 gal./min.

The anion solution was started 8 minutes before the cation solution. Therefore, the initial precipitation medium contained about 3.17 gallons of the anion solution (about 3.3 percent) at the start of precipitation. In addition, the initial precipitation medium also was made up of 20.411 kg. $NH_4Cl$ (381.60 moles) in sufficient water to make 29.83 gallons (total volume in tank at start of cation addition was 33.0 gallons).

The precipitation was carried out at a temperature of 55° C.

A typical alkaline earth haloapatite prepared by this method was a dense granular powder composed of botryoidal agglomerates having an average particle size of 10.4 microns. Microscopic examination showed further that the particles were substantially within the range of 3 to 30 microns.

When subjected to thermal refining as described in Example 1, the precipitate yielded a phosphor which contained 2.4 percent $Ca_3(PO_4)_2$.

Example 6

Example 1 was repeated using the following reactant solutions and precipitation medium, the precipitation being carried out at a temperature of 65° C. The reactant solutions were added concurrently over a period of 205 minutes and the pH of the reaction or precipitation medium was maintained within the range of 6.5 to 7.5 throughout the precipitation.

First reactant solution:
| | |
|---|---|
| $CaCl_2$ (moles) | 18.68 |
| HCl (moles) | .13 |
| $CdCO_3$ (moles) | .251 |
| $SbCl_3$ (moles) | .301 |
| $MnCl_2$ (moles) | .324 |
| Water to make (ml.) | 6,150 |

Second reactant solution:
| | |
|---|---|
| $(NH_4)_2HPO$ (moles) | 10.80 |
| $NH_4F$ (moles) | 3.423 |
| $NH_3$ (moles) | 13.5 |
| Water to make (ml.) | 12,680 |

Precipitation medium:
| | |
|---|---|
| $NH_4Cl$ (moles) | 7.48 |
| Second reactant solution (ml.) | 380 |
| Water to make (ml.) | 2,000 |

The resulting precipitate, upon being thermally refined as described in Example 1, exhibited an average particle size of 10 microns as determined using a Fisher "Sub-Sieve Sizer" and contained less than 0.5 percent tricalcium phosphate. Microscopic examination showed further that the particles were substantially within the range of 3 to 30 microns.

The botryoidal form of the above prepared material, both prior to and following the thermal refining treatment, is shown in the electron shadow micrographs of FIGS. 6 and 7. These contrast sharply with the nonbotryoidal form of calcium haloapatites prepared by conventional prior art firing methods, as evidenced by the electron shadow micrograph of FIG. 5 of a typical calcium haloapatite prepared by a conventional firing method. Each of these electron micrographs was made using the carbon-platinum replica technique previously described and all are at 10,000 × magnification.

Example 7

The preceding examples illustrate the use of the invention to prepare activated alkaline earth haloapatites of the kind employed in fluorescent lamp phosphors. It can also be used to prepare other kinds of phosphors such as the following europium-manganese activated calcium haloapatite.

First reactant solution:
| | |
|---|---|
| $CaCl_2$ (moles) | 1.05 |
| HCl (moles) | 0.124 |
| $Eu_2O_3$ (moles) | 0.011 |
| $MnCl_2$ (moles) | 0.028 |
| $H_2O$ to make (ml.) | 500 |

Second reactant solution:
| | |
|---|---|
| $(NH_4)_2HPO_4$ (moles) | 0.630 |
| $NH_4F$ (moles) | 0.192 |
| $NH_3$ (moles) | 0.829 |
| $H_2O$ to make (ml.) | 1,000 |

Precipitation medium:
| | |
|---|---|
| $(NH_4)_2HPO_4$ (moles) | 0.020 |
| Water to make (ml.) | 200 |

The precipitation was carried out essentially as described in Example 1, the reactant solutions being added over a period of 25-35 minutes.

The reaction mixture was filtered and the precipitate was dried overnight at 125° C. The dried precipitate was passed through a 270 mesh screen to remove any lumps. The compositions were then fully activated by subjecting them to thermal refining by heating at a temperature of 1,050°-1,175° C. for 5-10 minutes in a nonoxidizing atmosphere.

When subjected to cathodoexcitation, phosphors prepared as above display a dark yellow to white luminescence, depending upon the europium concentration, and are therefore useful for coating television and other cathode ray tubes. When excited by longwave ultraviolet radiation (365 nm), the same compositions display a pinkish white luminescence.

It is important that the precipitation medium contain an excess of phosphate ions during the early part of the precipitation, but the importance of this excess diminishes as the precipitation nears completion. Moreover, it has been found that an excess of alkaline earth ions at the end of the precipitation is beneficial to insure that the alkaline earth component of the precipitated haloapatite is stoichiometrically correct.

The initial overall excess of phosphate ions may be provided by adding 1-12 percent of the phosphate solution, which may also contain halide and other required ions, to the reaction vessel, before addition of the alkaline earth solution is begun. The remainder of the phosphate solution is then added concurrently with the alkaline earth solution. However, the initial excess of phosphate ions may be provided in other ways such as by dissolving a suitable amount of ammonium phosphate in the aqueous precipitation medium, the amount thus added being taken into account when preparing the phosphate solution.

The particle size and tricalcium phosphate content are affected by other factors, among the more significant being the rates of addition for the reactant solutions, and the temperature and rate of stirring of the precipitation medium. These factors are interrelated and interdependent so that their effect under certain conditions may be cumulative, or the effect of one may be counterbalanced by appropriate adjustment of one or more of the others. Generally speaking, increasing the rate of addition of the reactant solutions causes the precipitation of smaller particles which, when thermally refined, are less likely to contain a secondary tricalcium phosphate phase. Increasing the rate of stirring has the opposite effect; i.e., the particles are larger but more likely to form a secondary tricalcium phosphate phase when thermally refined. Increasing the precipitation temperature aids in obtaining granular precipitates of the desired particle size but also increase the tendency to form tricalcium phosphate. The effect of these other factors is lessened, however, when haloapatite is precipitated by the method of the present invention so that it is possible to precipitate larger-sized particles without increasing the tendency to form tricalcium phosphate.

By carrying out the process of the present invention as described above, novel granular luminescent compositions and phosphors are obtained which exhibit the described botryoidal form, have a particle size distribution within the range of 3 to 30 microns and a tricalcium phosphate content of less than 3 percent, generally less than 1 percent.

In view of the above, it will be seen that the several objects of the invention are achieved and other advantages results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. The method of preparing a luminescent composition consisting essentially of a precipitated alkaline earth haloapatite host lattice having at least one activator incorporated therein which comprises concurrently adding to a stirred precipitation medium containing water a first reactant solution comprising the required alkaline earth ions and a second reactant solution comprising a major portion of the required phosphate ions, said precipitation medium initially containing a minor portion of the required phosphate ions and being maintained at a temperature above about 55° C., thereby forming an alkaline earth halophosphate phosphor precipitate.

2. The method of claim 1 wherein a major proportion of the alkaline earth ions are calcium.

3. The method of claim 2 wherein from approximately 1 percent to approximately 12 percent of the required phosphate ions are added to the precipitation medium before the addition of calcium ions is initiated.

4. The method of claim 1 wherein said precipitation medium is maintained at a temperature of approximately 55°-75° C.

5. The method of claim 1 wherein at least one activator is manganese.

6. The method of claim 1 wherein the precipitation medium has a swirling motion imparted thereto, the first reactant solution being added to the precipitation medium in the region where movement of the medium is relatively minimal and the second reactant solution being added to the precipitation medium in the region where movement of the medium is relatively maximal.

7. The method of claim 1 wherein the precipitated luminescent composition is subjected to thermal refining by being heated at a temperature of approximately 1,050°-1,200 °C. for a brief period.

8. The method of preparing a luminescent composition consisting essentially of a precipitated alkaline earth haloapatite host lattice having at least one activator incorporated therein which comprises concurrently adding to a stirred precipitation medium containing water a first reactant solution comprising the required alkaline earth ions and a second reactant solution comprising a major portion of the required phosphate ions, said precipitation medium initially containing a minor portion of the required phosphate ions and being maintained at a temperature above about 55° C., and said first and second reactant solutions being added to the precipitation medium in such a manner that the alkaline earth ions are dispersed into the main body of the precipitation medium relatively more slowly than the phosphate ions, thereby forming an alkaline earth halophosphate phosphor precipitate.

9. The method of claim 8 where a major proportion of the alkaline earth ions are calcium.

10. The method of claim 8 wherein from approximately 1 percent to approximately 12 percent of the required phosphate ions are added to the precipitation medium before the addition of calcium ions is initiated.

11. The method of claim 8 wherein said precipitation medium is maintained at a temperature of approximately 55°–75° C.

12. The method of claim 8 wherein at least one activator is manganese.

13. The method of claim 8 wherein the precipitation medium has a swirling motion imparted thereto, the first reactant solution being added to the precipitation medium in the region where movement of the medium is relatively minimal and the second reactant solution being added to the precipitation medium in the region where movement of the medium is relatively maximal.

14. The method of claim 8 wherein the precipitated luminescent composition is subjected to thermal refining by being heated at a temperature of approximately 1,050°–1,200° C. for a brief period.

15. The method of preparing a phosphor consisting essentially of an alkaline earth haloapatite host lattice having at least one activator incorporated therein which comprises concurrently adding to a stirred precipitation medium containing water a first reactant solution comprising the required alkaline earth ions and a second reactant solution comprising a major portion of the required phosphate ions, said precipitation medium initially containing a minor portion of the required phosphate ions and being maintained at a temperature above about 55° C., and said first and second reactant solutions being added to the precipitation medium in such a manner that the alkaline earth ions are dispersed into the main body of the precipitation medium relatively more slowly than the phosphate ions, thereby forming an alkaline earth halophosphate phosphor precipitate, and thereafter subjecting the resulting precipitate to a thermal refining treatment.

16. The method of claim 15 wherein said thermal refining treatment consists of heating said precipitate at a temperature of approximately 1,050°–1,200° C. for a brief period.

* * * * *